May 24, 1927.
F. E. PIERSON
STOCK WATERING TANK
Filed Dec. 16, 1925
1,629,883
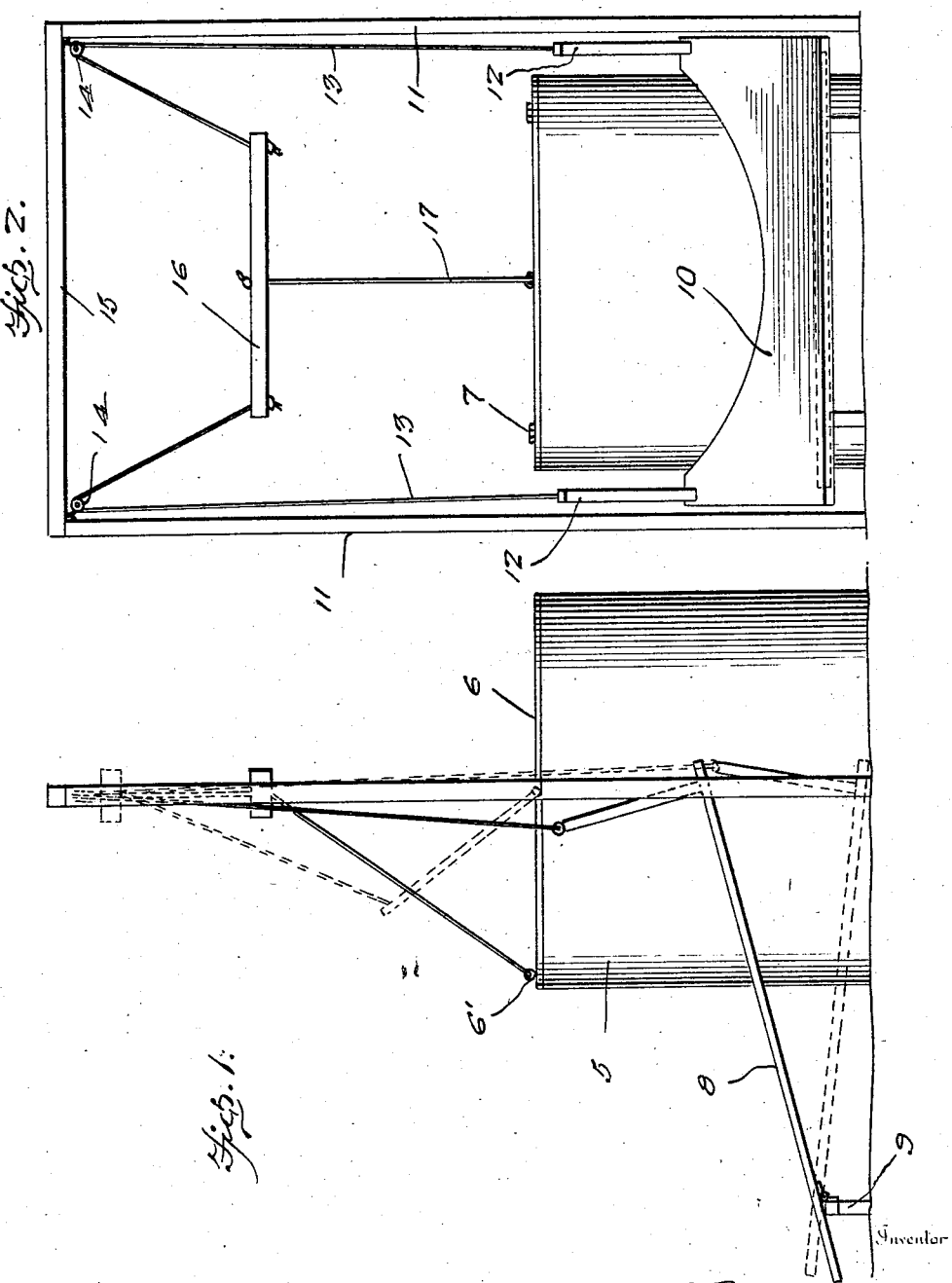

Patented May 24, 1927.

1,629,883

UNITED STATES PATENT OFFICE.

FLOYD E. PIERSON, OF OAKLAND, IOWA.

STOCK-WATERING TANK.

Application filed December 16, 1925. Serial No. 75,792.

This invention relates to a stock watering tank and has more particular reference to a construction whereby the same is opened by the action of the stock walking upon a platform.

The primary object of the invention is to provide a watering tank of the aforementioned character wherein the same is normally closed in order that the contents thereof will not readily freeze during cold weather.

A further and important object is to provide a simple and efficient means wherein the lid of the tank may be readily moved to open position by the action of the stock through the medium of a simple and highly efficient mechanism.

With the above and other objects in view as the nature of the invention is better understood, the same comprises the novel form, combination and arrangement of parts hereinafter more fully described, shown in the accompanying drawing and claimed.

In the drawing wherein like reference characters designate corresponding parts throughout the several views:

Figure 1 is a side elevation of my improved watering tank, the lid thereof together with its operating mechanism is shown in full and dotted line position, and Figure 2 is a front elevation of the tank.

Now having particular reference to the drawing, 5 designates a tank of predetermined capacity, that is provided with a sectional lid 6 at its upper open end, one half of which, designated 6', is hinged as at 7 to the other half in order that it may be moved to open position as shown in dotted lines in Figure 1 whereby access may be had to the contents of the tank by the animals.

In order that the hinged portion 6' of said lid may be moved to open position by the action of the stock, there is provided a platform 8 that is suitably pivoted adjacent its outer end to a support 9. The forward end of this platform being cut out on an arc as indicated at 10 in order that the sides thereof may extend around the tank between vertical standards 11—11 in spaced relation with diametrically opposed points of the tank, as clearly shown in Figure 2.

The platform 8 is provided at opposite sides of said tank 5 with vertical arms 12—12, from which extend cables 13—13 that are trained over pulleys 14—14 at the upper inner sides of said standards 11—11 which standards are connected through the medium of a cross bar 15 at the upper end thereof. The cables 13—13 then extend inwardly and downwardly and are secured to a cross weighted bar 16 which is connected at its center to the front edge of the hinged section 6' of the lid through the medium of a cable 17.

The weighted bar 16 will so pull upon the cables 13—13 that are connected to said arms 12—12 as to maintain the platform in the upwardly inclined position as shown in both the figures, in order that the stock may conveniently pass thereon. The weight of the stock will overcome the action of the weighted bar 16 and consequently the platform 8 will be moved downwardly to the dotted line position shown in Figure 1. Such a downward movement will pull upon the cables 13—13 in a reverse direction, and consequently the cross weighted bars 16, which through the action of the cable 17 raises the lid section 6' of said lid to the open dotted line position of Figure 1 in order that the stock may drink from the tank.

It will be seen that I have provided a highly novel, simple, and efficient form of stock watering tank wherein the same will be normally closed, but to which access may be readily gained by the stock in a simple and efficient manner.

Minor changes may be made in the invention without departing from the spirit and scope of the appended claim.

Having thus described the invention, what I claim as new is:—

In a stock watering device of the class described, a receptacle having a hinged lid, vertical standards on opposite sides of the tank, a bar extending across the upper ends of the standard, a platform pivoted adjacent its outer end, the inner end being cut out to conform to the contour of the receptacle, arms extending upwardly from the inner end portion of the pivoted platform and disposed between the receptacle and the respective standards, cables connected to the upper ends of the arms of said platform and extending upwardly adjacent the standards, pulleys secured to the upper ends of the standards and over which the cables are trained, a weighted bar, the other ends of the cables being attached to said bar, and an additional cable connecting the weighted bar with the hinged lid, said weighted bar and said last mentioned cable cooperating to return the lid to a closed position and simultaneously raise the inner end of the platform when pressure is relieved from the pivoted platform.

In testimony whereof I affix my signature.

FLOYD E. PIERSON.